No. 669,164. Patented Mar. 5, 1901.
H. E. GUYN.
FLOWER POT.
(Application filed June 8, 1900.)
(No Model.)
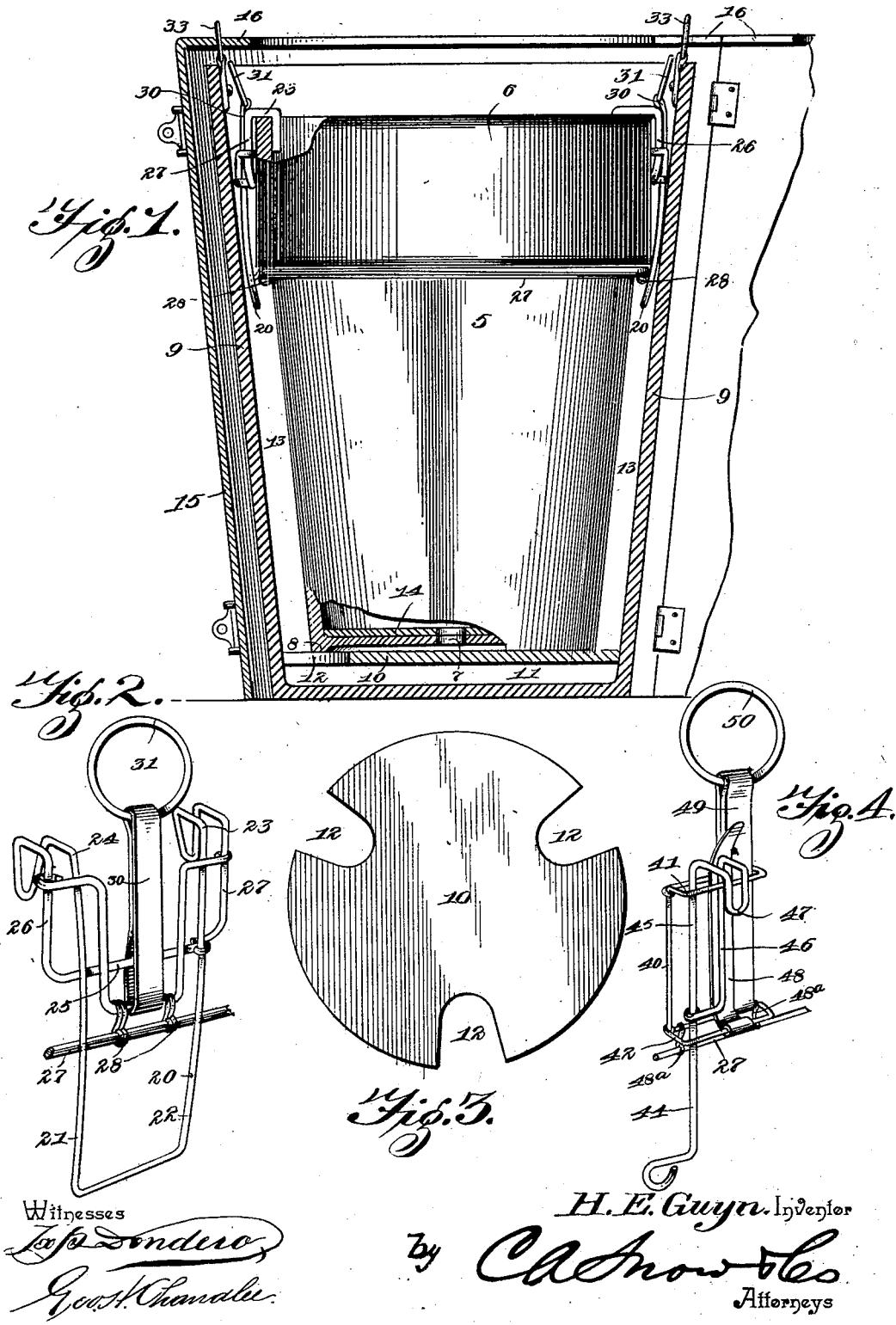
Witnesses
H. E. Guyn, Inventor
by C. A. Snow & Co.
Attorneys

UNITED STATES PATENT OFFICE.

HENRY E. GUYN, OF PHILADELPHIA, PENNSYLVANIA, ASSIGNOR OF ONE-HALF TO GEORGE L. H. GUYN, OF SAME PLACE.

FLOWER-POT.

SPECIFICATION forming part of Letters Patent No. 669,164, dated March 5, 1901.

Application filed June 8, 1900. Serial No. 19,594. (No model.)

*To all whom it may concern:*

Be it known that I, HENRY E. GUYN, a citizen of the United States, residing at Philadelphia, in the county of Philadelphia and State of Pennsylvania, have invented a new and useful Flower-Pot, of which the following is a specification.

This invention relates to flower-pots in general, and more particularly to that class designed for indoor use, where it is desired that they shall be ornamental and shall not leak, the object of the invention being to provide a composite pot including several telescopic members and means for facilitating the raising of the flower-holding member.

In the drawings forming a portion of this specification, and in which like numerals of reference indicate similar parts in the several views, Figure 1 is a vertical section taken through the water-holding member of the pot and showing the flower or earth holding member in elevation, the two-part exterior casing being opened and partly broken away. Fig. 2 is a perspective view showing one form of handle for the earth-holding member of the pot and through the medium of which it may be raised. Fig. 3 is a plan view of the supporting-disk, which is disposed adjacent the bottom of the water-holding member and which receives and supports the dirt or earth holding member. Fig. 4 is a perspective view showing a modification of handle.

Referring now to the drawings, the pot comprises an inner earth-holding member 5, of usual form, which is tapered downwardly and has the usual flange 6 at its upper end and on its outer face, said member having also a central opening in its bottom, said bottom being disposed slightly above the lower end of the side of the member to form a resting or supporting flange 8.

The second member of the flower-pot consists of an impervious frusto-conical vessel 9, which directly receives the earth-holding member 5, the member 5 resting directly upon a supporting-disk 10, having a diameter slightly greater than the member 9 at its bottom, so that said disk will rest with its periphery against the inner face of the member 9, a slight distance above the bottom of said member, so that an interspace or chamber 11 is formed between the disk and the bottom of the member 9.

The inner surface of the member 9 and the outer surface of member 5 are separated by an annular chamber, as shown, which chamber communicates with the interspace 11 through openings 12, formed in the disk 10, these openings extending from the periphery of the disk inwardly to such a degree as to run under the flange 8 of the member 5. Thus communication is had between the member 5 and the chamber 13, between it and member 9, through the opening in the bottom of the member 5, the openings 12, the chamber 11, and back through openings 12. Therefore any excess of water that may be poured into the member 5 may rise in the member 9, and water may be contributed to the bottom of member 5 by pouring into the member 9.

To facilitate removal of a plant from the member 5, a disk 14 is disposed therein and lies against the bottom of the member, so that the plant may not be held by adhesion of its roots to the bottom of the pot.

Exteriorly of the member 9 is an ornamental casing 15, which is frusto-conical in form and made in two parts divided by a plane including the axis of the casing, the two parts of the casing being hinged together at one edge and having clasps at their opposite edges to facilitate application and removal. At the upper edge of the casing is formed an inwardly-directed flange 16, which projects inwardly beyond the upper end of the member 9 to hide the latter.

In order that the member 5 may be readily lowered into and raised from the member 9 and also in order that it may be lowered into and raised from a hole in the ground in which it may be deposited during the summer, handles are provided. These handles are similar in form and, as shown in Fig. 2, each consists of a spring-wire 20, which is bent into U shape, the sides 21 and 22 thereof being bent upon themselves to lie in a common plane, after which the bent-over resultant ends 23 and 24 are bent into hook form, as shown, to engage over the upper edge of the pot or member 5. The extremity of the wire-forming side 21 is bent transversely of wires 21 and 22 and engaged with the latter, while the extremity of the side wire 22 is bent laterally across the side 22 and is unconnected. The web of this U-shaped wire 20 lies against the side of the member 5 or adjacent thereto and extends below the flange at the upper end of said member. A second U-shaped wire 25 is disposed between the sides 21 and 22 of the wire 20 and has its ends bent outwardly and around the outer returned portions 26 and 27 of the sides 21 and 22, as shown, the wire 25 being thus slidably engaged with wire 20.

A hoop 27 is passed around the pot or member 5, just below the upper flange thereof, and the web of the wire 25 is connected thereto by means of links 28, the slidable engagement of wire 20 with wire 25 permitting the engagement of the hooks of wire 20 over the upper edge of the pot.

The construction described forms the means for attaching the handles to the pot, and the handles proper consist of metallic straps 30, which are passed around the webs of wires 25 and extended upwardly between the legs thereof and have rings 31 engaged with their upper ends. Thus in raising the pot these rings serve as handles and may be grasped to facilitate the operation. The member 9 has also handles attached thereto and consisting of rings 33, secured to the inner face of the member by plates, which are passed through the rings and held by rivets.

In Fig. 4 of the drawings is shown a form of handle-attaching device, comprising a frame consisting of a wire 40, having rectangular loops 41 and 42, formed at its ends and extending laterally therefrom, these loops forming guides for the hook member, which latter consists of a wire 44 bent upon itself to form two sides 45 and 46, which are then bent over to form a hook 47 for engagement over the upper edge of the pot, the lower end of the side 46 being bent laterally and having an eye formed therein which engages the side 45, the lower end of the side 45 being extended downwardly through the loop 42, below which it is turned transversely to prevent disengagement. A spring-plate 48 is fixed upon the outer side of the loop 42 and lies behind and against the side 46 of wire 44, the upper end of the plate being bent forwardly to form a spring-stop for the hook 47. Links 48ª are connected with the loop 42 for engagement with the wire about the pot, while a strap 49, of metal, is also engaged with loop 42 and passes above loop 41, where it is provided with a ring 50.

It will be understood that in practice various modifications of the construction shown may be made and that any suitable materials and proportions may be used for the various parts without departing from the spirit of the invention.

What is claimed is—

1. A composite flower-pot comprising an inner earth-holding member having a bottom flange and an opening in its base, a downwardly-tapered water-holding vessel inclosing the earth-holding member, and a plate disposed in the water-holding vessel upon the convergent walls thereof and separated from the bottom thereof by an interspace, said plate having radially-extending slots in its periphery and adapted to receive and support the earth-holding member with the bottom flange of the earth-holding member lying between the ends of each slot of the plate.

2. A composite flower-pot comprising an inner earth-holding member having a bottom flange and an opening in its base, a water-holding vessel inclosing the earth-holding member, and a plate disposed in the water-holding vessel and separated from the bottom thereof by an interspace, said plate being adapted to receive and support the earth-holding member and having radially-extending slots formed through its periphery and lying with their ends at opposite sides of the flange of the earth-holding member, to permit direct communication between the inclosure of the flange, the earth-holding member and the space between the plate and the bottom of the water-holding vessel.

3. A composite flower-pot comprising an earth-holding member, a downwardly-tapered water vessel, a plate having radial slots extending from its periphery, said plate resting on the tapered walls of the vessel and separated from the bottom thereof by an interspace, and adapted to receive the earth-holding member, a flange on the bottom of the earth-holding member to rest on the plate between the ends of each of the slots thereof, and handles engaged with the earth-holding member and adapted to rest against the inner wall of the water vessel and hold the earth-holding member with the flange thereof between the ends of the slots of the plate, said earth-holding member having also a central opening in its bottom.

In testimony that I claim the foregoing as my own I have hereto affixed my signature in the presence of two witnesses.

HENRY E. GUYN.

Witnesses:
WM. F. METTLEN,
WM. H. BEATTY.